United States Patent
Khorasaninejad et al.

(10) Patent No.: US 10,634,557 B2
(45) Date of Patent: Apr. 28, 2020

(54) SUPER-DISPERSIVE OFF-AXIS META-LENSES FOR HIGH RESOLUTION COMPACT SPECTROSCOPY

(71) Applicant: PRESIDENT AND FELLOWS OF HARVARD COLLEGE, Cambridge, MA (US)

(72) Inventors: Mohammadreza Khorasaninejad, Cambridge, MA (US); Federico Capasso, Cambridge, MA (US); Wei Ting Chen, Cambridge, MA (US); Jaewon Oh, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 16/091,976

(22) PCT Filed: Apr. 7, 2017

(86) PCT No.: PCT/US2017/026704
§ 371 (c)(1),
(2) Date: Oct. 5, 2018

(87) PCT Pub. No.: WO2018/009258
PCT Pub. Date: Jan. 11, 2018

(65) Prior Publication Data
US 2019/0162592 A1 May 30, 2019

Related U.S. Application Data

(60) Provisional application No. 62/320,385, filed on Apr. 8, 2016.

(51) Int. Cl.
*G01J 3/28* (2006.01)
*G01J 3/02* (2006.01)
*G02B 3/08* (2006.01)
*G01J 3/18* (2006.01)
*G01J 3/00* (2006.01)

(52) U.S. Cl.
CPC ............ *G01J 3/0208* (2013.01); *G01J 3/00* (2013.01); *G01J 3/0256* (2013.01); *G01J 3/18* (2013.01); *G02B 3/08* (2013.01); *G02B 2207/101* (2013.01)

(58) Field of Classification Search
CPC .... G01J 3/10; G01J 3/2823; G01J 3/28; G01J 3/2803; G01J 3/02
USPC .................................................... 356/326
See application file for complete search history.

(56) References Cited

U.S. PATENT DOCUMENTS 6,061,135 A 5/2000 Levitt et al.
2016/0077261 A1 3/2016 Arbabi et al.

OTHER PUBLICATIONS

International Search Report and Written Opinion for International Patent Application No. PCT/US2017/026704, dated Dec. 28, 2017, 10 pages.

(Continued)

*Primary Examiner* — Md M Rahman
(74) *Attorney, Agent, or Firm* — Foley & Lardner LLP

(57) ABSTRACT

A meta-lens having a phase profile includes a substrate and a plurality of nanostructures disposed on the substrate. The nanostructures together define the phase profile of the meta-lens. The phase profile achieves an off-axis focus. Each nanostructure is designed according to at least one design parameter of the nanostructure that imparts a phase shift of light passing through the nanostructure.

8 Claims, 10 Drawing Sheets

(56) References Cited

OTHER PUBLICATIONS

Khorasaninejad, M., et al., "Achromatic Metasurface Lens at Telecommunication Wavelengths", Nano Letters, 2015, 15(8), pp. 5358-5362, Jul. 13, 2015.
Khorasaninejad, M., et al., "Super-Dispersive Off-Axis Meta Lenses for Compact High Resolution Spectroscopy", Nano Letters, 2016, 16(6), pp. 3732-3737, Apr. 27, 2016.

Scale bar: 600 nm $\varphi_{nf}(x,y) = 2\theta_{nf}(x,y)$

Substrate with resist

Exposed pattern

Initial ALD

Completed ALD

Etched film

Final metasurface

SUPER-DISPERSIVE OFF-AXIS META-LENSES FOR HIGH RESOLUTION COMPACT SPECTROSCOPY

CROSS-REFERENCE TO RELATED APPLICATIONS

This application is a National Stage Entry of International Application No. PCT/US2017/026704, filed Apr. 7, 2017, which claims the benefit of and priority to U.S. Provisional Patent Application No. 62/320,385, filed Apr. 8, 2016, which is incorporated herein by reference in its entirety.

STATEMENT OF FEDERALLY SPONSORED RESEARCH OR DEVELOPMENT

This invention was made with Government support under FA9550-14-1-0389, awarded by the Air Force Office of Scientific Research. The Government has certain rights in the invention.

BACKGROUND

A spectrometer is a device that conducts optical dispersion for splitting light into an array of light beams of separate colors. Thus, the spectrometer is used to analyze the intensity of light as a function of wavelength or frequency. Such a spectral analysis can determine chemical composition of an object that emits, transmits, or reflects the light. A spectral resolution of the spectrometer indicates how well two close-lying wavelengths or frequencies can be resolved. In a conventional spectrometer, a relatively long propagation distance is included to sufficiently separate different wavelengths for high spectral resolution, which can make the spectrometer bulky.

SUMMARY

Metasurfaces allow for the miniaturization of conventional optics by achieving control over an optical wavefront. Utilizing the metasurfaces, meta-lenses are planar devices that include nanostructures (e.g., nanofins or nanopillars) for controlling the optical wavefront. The present disclosure describes off-axis meta-lenses that concurrently focus and disperse light of different wavelengths with unprecedented spectral resolution. The meta-lenses in some embodiments of the present disclosure may be designed based on geometric phase of rotated silicon nanofins, and the meta-lens may focus light at angles as large as about 80° (or greater). Due to large angle focusing, these meta-lenses may have super-dispersive characteristics (e.g., about 0.27 nanometers per milliradian (nm/mrad)) that make them capable of resolving wavelength differences as small as about 200 picometers (pm) in the telecommunication (or telecom) spectrum.

In addition, by combining several meta-lenses together in some embodiments of the present disclosure, high spectral resolution may be achieved for a wide wavelength range. The meta-lenses may have measured efficiencies as high as about 90% (or higher) in a wavelength range of about 1.1 micrometers (μm) to about 1.6 μm. Due to the planar and compact configuration together with high spectral resolution, these meta-lenses have significant potential for various application such as emerging portable or wearable optics technology.

In an aspect according to some embodiments, a meta-lens having a phase profile includes a substrate and a plurality of nanostructures disposed on the substrate. The nanostructures together define the phase profile of the meta-lens. The phase profile achieves an off-axis focus. Each nanostructure is designed according to at least one design parameter of the nanostructure that imparts a phase shift of light passing through the nanostructure.

In some embodiments, the phase shifts imparted by the nanostructures disposed on different locations on the substrate achieve a constructive interference of light of a design wavelength at an off-axis focal point.

In some embodiments, for each individual nanostructure of the nanostructures, the phase shift imparted the individual nanostructure compensates a propagation phase difference associated with an optical path difference of the individual nanostructure relative to a focal length of the meta-lens.

In some embodiments, the at least one design parameter of the nanostructure that imparts the phase shift varies among the nanostructures depending on a location where the nanostructure is disposed on the substrate.

In some embodiments, the at least one design parameter of the nanostructure that imparts the phase shift is an orientation of the nanostructure, a dimension of the nanostructure, a size of the nanostructure, a volume of the nanostructure, an aspect ratio of the nanostructure, a material of the nanostructure, a spatial arrangement of the nanostructure, a shape of the nanostructure, or a combination of two or more thereof.

In some embodiments, the nanostructures include nanofins, and the at least one design parameter of each nanofin is an orientation of the nanofin with respect to an axis in a plane of the substrate.

In some embodiments, at least some of neighboring nanofins are oriented at different angles. In some embodiments, a cross section of nanofins can have a 2-fold rotational symmetry, or more generally, an n-fold rotational symmetry where n is an integer that is 2 or greater than 2. In some embodiments, a first nanofin can be substantially aligned with a selected axis (e.g., a rotation θ of the first nanofin is zero), and a second nanofin can be rotated with respect to the selected axis and with respect to the first nanofin by an angle θ that is at least about ±5°, at least about ±10°, at least about ±15°, or at least about ±20°.

In some embodiments, at least some of neighboring nanofins are oriented at different orientation angles, the orientation angles determine the phase shifts to compensate propagation phase differences of the neighboring nanofins, and the propagation phase differences are associated with differences of optical paths between locations of the neighboring nanofins on the substrate and an off-axis focal point of the meta-lens.

In some embodiments, the orientation of each nanofin at coordinates (x, y) on the substrate is determined by $$\theta_{nf}(x, y) = \frac{\pi}{\lambda_d}\left(f - \sqrt{(x-x_f)^2 + (y-y_f)^2 + z_f^2}\right),$$

where $\lambda_d$ is a design wavelength of the meta-lens and f is a design focal length of the meta-lens, and a design focal point of the meta-lens is located at $(x=x_f, y=y_f, z=z_f)$.

In some embodiments, the nanostructures include nanopillars.

In some embodiments, the least one design parameter of each nanopillar is a diameter of the nanopillar.

In some embodiments, at least some of neighboring nanopillars have different diameters, the diameters determine the phase shifts to compensate propagation phase differences of the neighboring nanopillars, and the propagation phase differences are associated with differences of optical paths between locations of the neighboring nanopillars on the substrate and an off-axis focal point of the meta-lens. In some embodiments, a first nanopillar can have a first diameter, and a second nanopillar can have a second diameter, where the second diameter is at least about 1.1 times greater than the first diameter, such as at least about 1.2 times greater, at least about 1.3 times greater, at least about 1.4 times greater, or at least about 1.5 times greater.

In some embodiments, the off-axis focus of the phase profile involves focusing collimated light to a point, focusing collimated light to a line, focusing uncollimated light to a point, focusing uncollimated light to a line, focusing light from a point to a point, focusing light from a spot to a spot, or focusing light from a line to a line.

In some embodiments, the plurality of nanostructures of the meta-lens are configured to resolve wavelength differences of greater than or equal to about 200 picometers for light in a telecom spectrum.

In another aspect according to some embodiments, a spectrometer includes an off-axis meta-lens and an imaging device. The off-axis meta-lens is configured to receive light including a plurality of light components of different wavelengths, and to refocus and disperse the light components onto a plurality of off-axis focal points associated with the different wavelengths. The off-axis meta-lens includes a substrate and a plurality of nanostructures disposed on the substrate. The nanostructures together define the phase profile of the off-axis meta-lens. The phase profile achieves an off-axis focus. Each nanostructure is designed according to at least one design parameter of the nanostructure that imparts a phase shift of light passing through the nanostructure. The imaging device is configured to record the refocused light components at the off-axis focal points respectively.

In some embodiments, the imaging device is further configured to separately detect characteristics of the light components of the different wavelengths.

In some embodiments, the spectrometer includes a plurality of off-axis meta-lens including the off-axis meta-lens, each of the plurality of off-axis meta-lens is configured to refocus and disperse light of a different spectrum.

In some embodiments, the nanostructures include nanofins, the at least one design parameter of each nanofin is an orientation of the nanofin with respect to an axis in a plane of the substrate, and the orientations of the nanofins vary to compensate propagation phase differences associated with optical path differences of the nanofins.

In some embodiments, the nanostructures include nanopillars, the at least one design parameter of each nanopillar is a diameter of the nanopillar, and the diameters of the nanofins vary to compensate propagation phase differences associated with optical path differences of the nanopillars.

In yet another aspect according to some embodiments, a planar dispersive device includes a substrate and a plurality of off-axis meta-lenses. The off-axis meta-lenses are arranged in a planar configuration. Each off-axis meta-lens is configured to refocus and disperse light of a different designed wavelength range. Each off-axis meta-lens includes a plurality of nanostructures disposed on the substrate. Each nanostructure has at least one design parameter of the nanostructure that imparts a phase shift of light passing through the nanostructure. The phase shifts of the nanostructures together define a phase profile of the off-axis meta-lens. The phase profile achieves refocus and dispersion of light of a corresponding designed wavelength range into a plurality of light components that focuses at a plurality of designed off-axis focal points. The designed off-axis focal points of the plurality of off-axis meta-lenses locate at a common plane.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1A:
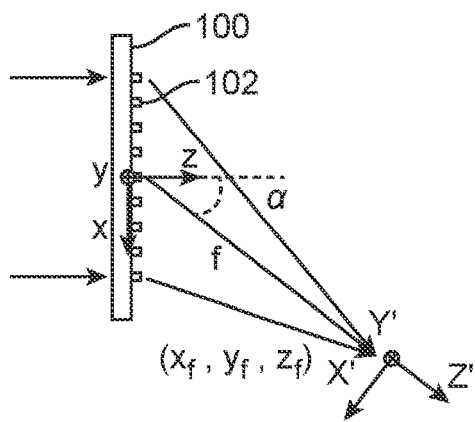
FIG. 1A diagrammatically illustrates a cross-sectional side view of a meta-lens that focuses incident light off-axis.

Described in at least some embodiments of the present disclosure are meta-lenses based on highly sensitive metasurfaces. The meta-lenses incorporate dispersive nanostructures (e.g., nanofins and/or nanopillars). Embodiments of such meta-lenses may be used, for example, in spectroscopy. In a conventional spectrometer, a relatively long propagation distance is included to sufficiently separate different wavelengths for a high spectral resolution. The long propagation distance results in a bulky conventional spectrometer. In contrast, a compact and efficient super-dispersive meta-lens in the telecom spectrum according to some embodiments of the present disclosure is capable of resolving wavelength differences down to about 200 pm or less, such as, for example, in the tens of pm. The meta-lens accomplishes the high spectral resolution by focusing at large angles, resulting in a highly dispersive response.

In other words, the meta-lenses can achieve focusing at large angles resulting in super-dispersive characteristics to resolve the incident wavelength in a compact configuration. Further, in some embodiments of the present disclosure, by combining meta-lenses with different design wavelengths, high spectral resolution can be preserved for a wider wavelength range with additional potential to improve the signal-to-noise ratio in a spectroscopic system.

Due to the birefringent nature, nanofins may be used to distinguish the handedness of light. By changing the geometrical parameters of the constituent structures of the nanostructures, the meta-lenses can be either polarization insensitive or sensitive to arbitrary polarization states. As a result, meta-lenses according to some embodiments of the present disclosure can also provide for high-efficiency multispectral and chiral imaging.

The use of these meta-lenses can be extended into the visible spectrum (or other spectrums) using materials such as aluminum oxide, gallium phosphide, silicon nitride and titanium dioxide, which have relatively high refractive indices with negligible loss. In particular, since beam size is proportional to wavelength, spectral resolution may be improved by operating at the shorter wavelengths of the visible spectrum.

Although various examples described and illustrated herein may refer to specific design wavelengths, such as telecom spectrum or visible spectrum, it is to be understood that a meta-lens may be designed and fabricated for any wavelength in the telecom spectrum or outside of the telecom spectrum. For example, a design wavelength can be in a range from about 200 nm, about 300 nm, or less, to about 30 μm or greater, encompassing the ultraviolet spectrum, the visible spectrum, near-infrared spectrum, and mid-infrared spectrum.

It is to be understood that the term "design" or "designed" (e.g., as used in "design wavelength," "design focal length" or other similar phrases herein) refers to parameters set during a design phase; which parameters after fabrication may have an associated tolerance.

Structure of Off-Axis Meta-Lenses Including Nanofins

FIG. 1A diagrammatically illustrates a cross-sectional side view of a meta-lens that focuses incident light off-axis. The meta-lens of some embodiments of the present disclosure includes dispersive nanostructures 102 as, at least some of, building blocks of the meta-lens which are disposed on a substrate 100. Two types of such dispersive nanostructures are nanofins and nanopillars. The meta-lens may include multiple dispersive nanostructures, each of which focuses incident light at a specific angle. Although the nanofins are shown with a rectangular cross sectional shape, other shapes are encompassed by embodiments of this disclosure, such as square-shaped, triangular, and other polygonal or non-polygonal shapes that can impart a desired phase profile.

For example, as illustrated in FIG. 1A, a reference nanofin at (x=0, y=0, z=0) in an x, y, z coordinate system focuses light along an optical path f at an angle α with respect to the z axis. The light is incident on the meta-lens in the z-direction. The light is further focused along the optical path fin the z' direction of an x', y', z' coordinate system, towards a focal point at (x=$x_f$, y=$y_f$, z=$z_f$).

Similar to the reference nanofin, each nanofin in the x, y plane receives incident light in the z-direction and focuses the light to the focal point (x=$x_f$, y=$y_f$, z=$z_f$). The light focused from each nanofin arrives at the focal point ($x_f$, $y_f$, $z_f$) in phase, because each nanofin in the x, y plane compensates for a phase delay associated with an optical path difference relative to the optical path with focal length f. Note that, in some other embodiments of the present disclosure, rather than being designed to have a focal point (x=$x_f$, y=$y_f$, z=$z_f$), the design may instead be for a focal line (x=$x_f$ and z=$z_f$ are both constants).

Figure 1B:
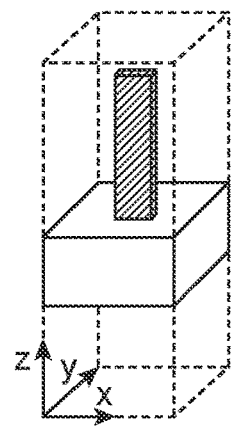
FIG. 1B diagrammatically illustrates a perspective view of a nanofin.

FIG. 1B is a diagrammatic perspective view illustrating that each nanofin may occupy a unit area on the x-y plane. Multiple such unit areas of a meta-lens may be arranged in an approximately square lattice (or other shape of lattice, such as, for example, a hexagonal lattice) with a center-to-center distance of about 500 nm.

Figure 1C:
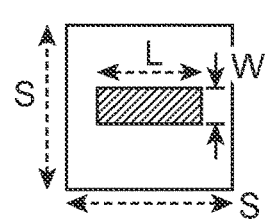
FIG. 1C diagrammatically illustrates a top view of a nanofin.
Figure 1D:
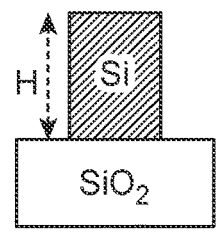
FIG. 1D diagrammatically illustrates a side view of a nanofin.

FIG. 1C is a diagrammatic top view of a nanofin of width W and height L, in a unit area with design dimensions of length S along the sides of the unit area. FIG. 1D is a diagrammatic side view of a nanofin of height H disposed on a unit area of a silicon dioxide ($SiO_2$) substrate. In some other embodiments, other substrate materials may be used.

Figure 1E:
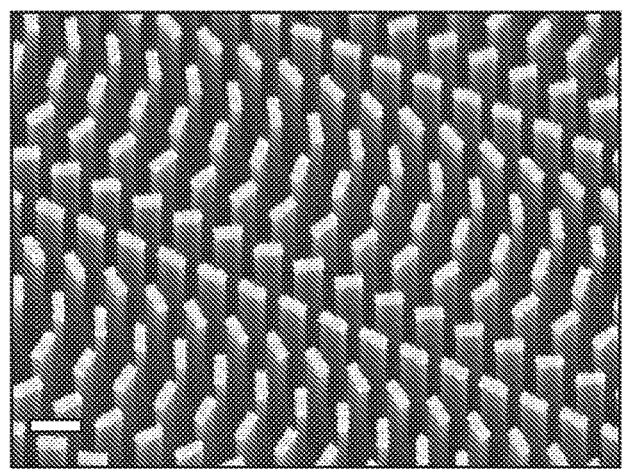
FIG. 1E illustrates a scanning electron microscope (SEM) image of a portion of a meta-lens.

FIG. 1E is a scanning electron microscope (SEM) image of a portion of a fabricated meta-lens with multiple nanofins. The meta-lens and nanofins have off-axis focusing features described with respect to FIG. 1A. In the embodiment illustrated in FIG. 1E, each nanofin has a width W=about 120 nm, length L=about 300 nm, and height H=about 1500 nm.

Figure 2A:
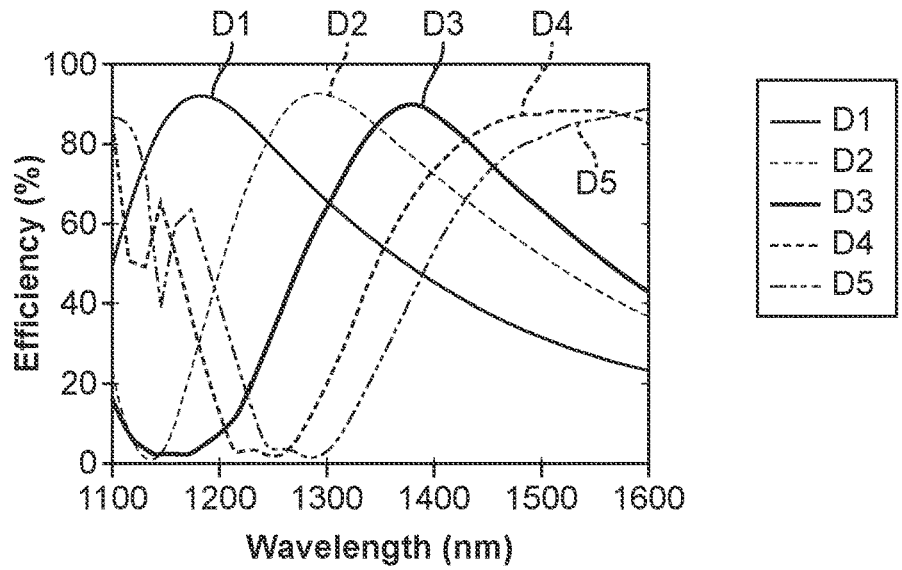
FIG. 2A illustrates a simulated efficiency of a meta-lens versus wavelength.

FIG. 2A illustrates simulation result of efficiencies for different meta-lens designs (e.g., different widths and lengths) under circularly polarized light illumination, for meta-lenses according to embodiments of the present disclosure. For example, a wavelength where maximum efficiency occurs can be adjusted by tuning widths and lengths of the nanofins. Simulated in FIG. 2A are five designs D1-D5: for D1, $W_1$=90 nm and $L_1$=290 nm; for D2, $W_2$=115 nm and $L_2$=300 nm; for D3, $W_3$=180 nm and $L_3$=290 nm;

for D4, $W_4$=105 nm and $L_4$=410 nm; and for D5, $W_5$=115 nm and $L_5$=420 nm. Height is H=1500 nm for the simulated designs D1-D5.

The term conversion efficiency (also referred to as simply "efficiency") as used in some embodiments of the present disclosure is defined as a ratio of the optical power of the focused beam to the optical power of the incident beam.

Figure 2B:
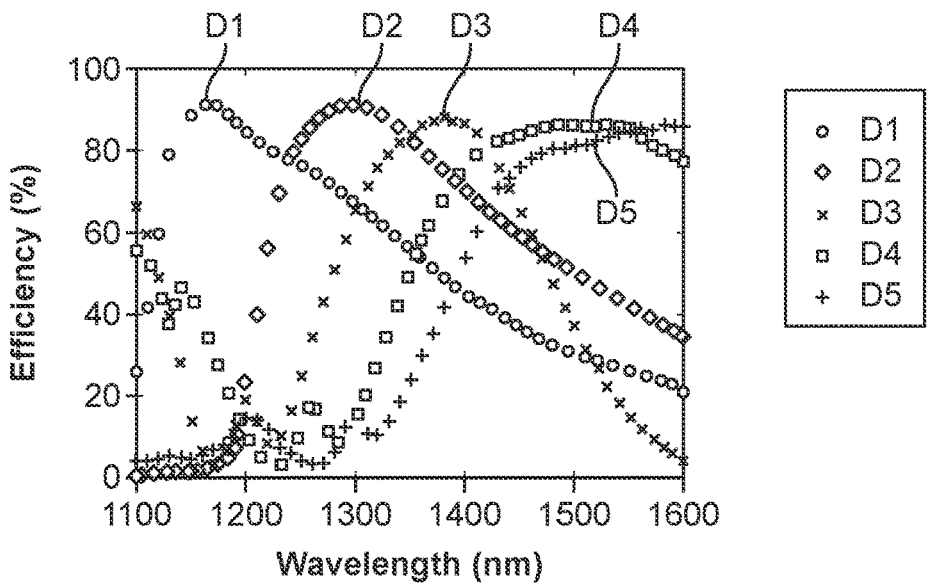
FIG. 2B illustrates a measured efficiency of a meta-lens versus wavelength.

FIG. 2B illustrates measured efficiencies for five fabricated meta-lens D1-D5 with the same design width, length and height as the corresponding simulated designs D1-D5. As can be seen by a comparison of FIGS. 2A and 2B, the measured efficiencies of the fabricated meta-lenses compare favorably with the simulated efficiencies for the same design width, length and height of the constituent nanofins. Both the simulations (as shown in FIG. 2A) and experiments (as shown in FIG. 2B) may be performed with circularly polarized light.

Considering the reference nanofin at the center of the meta-lens (x=0, y=0, z=0), a phase delay due to a difference in optical paths between light focused by a nanofin at a position (x, y) and light focused by the reference nanofin can be written as in equation (1), where is the design wavelength and f is the focal length, that is, the distance from the reference nanofin at (x=0, y=0, z=0) to the focal point (x=$x_f$, y=$y_f$, z=$z_f$).

$$\begin{cases} \varphi_d(x, y) = \frac{2\pi}{\lambda_d}\left(\sqrt{(x-x_f)^2 + (y-y_f)^2 + z_f^2} - f\right) \\ f = \sqrt{x_f^2 + y_f^2 + z_f^2} \end{cases} \quad (1)$$

Figure 3:
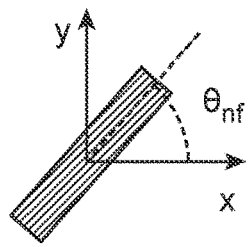
FIG. 3 illustrates rotation of a nanofin in an x-y plane to achieve a desired phase profile of the nanofin.

To achieve constructive interference and form a focal spot, the propagation phase difference of equation (1) is compensated by a phase shift $\varphi_{nf}(x,y)$ imparted by the nanofin at location (x, y). Therefore, $\varphi_{nf}$ satisfies the condition $\varphi_{nf}(x,y)=-\varphi_d(x,y)$. Based on a geometric phase concept, this can be accomplished via rotation of the nanofins by an angle $\varphi_{nf}(x,y)$ (FIG. 3) with respect to the x-axis in the x-y plane, which introduces a phase shift $\varphi_{nf}(x,y)=2\theta_{nf}(x,y)$ for right-handed circularly polarized illumination. Accordingly, each nanofin at (x, y) may be rotated by an angle as shown in equation (2).

$$\theta_{nf}(x, y) = \frac{\pi}{\lambda_d}\left(f - \sqrt{(x-x_f)^2 + (y-y_f)^2 + z_f^2}\right) \quad (2)$$

For a meta-lens functioning as a cylindrical lens, $\varphi_{nf}$ is not a function of y, and equation (1) simplifies to equation (3).

$$\varphi_{nf}(x) = \frac{2\pi}{\lambda_d}\left(f - \sqrt{(x-x_f)^2 + z_f^2}\right) \quad (3)$$

Using equation (3), a lens is designed to focus light into a line at an angle $$\alpha = \sin^{-1}\left(\frac{x_f}{f}\right)$$

with a focal length $f=\sqrt{x_f^2+z_f^2}$. A meta-lens according to such a design is shown in the SEM image in FIG. 1E. In some embodiments, nanofin parameters for the meta-lens (e.g., the meta-lens illustrated in FIG. 1E) may be optimized using a three-dimensional finite difference time domain (FDTD) technique.

A maximum conversion efficiency for circular polarization occurs when the nanofins act as half-waveplates. As illustrated in FIG. 2A, for a selected wavelength $\lambda_d$ (or range of wavelengths), the conversion efficiency peak can be adjusted by modifying parameters of the nanofins, e.g., the lengths and widths of the nanofins.

Characterization of Off-Axis Meta-Lenses Including Nanofins

Figure 4:
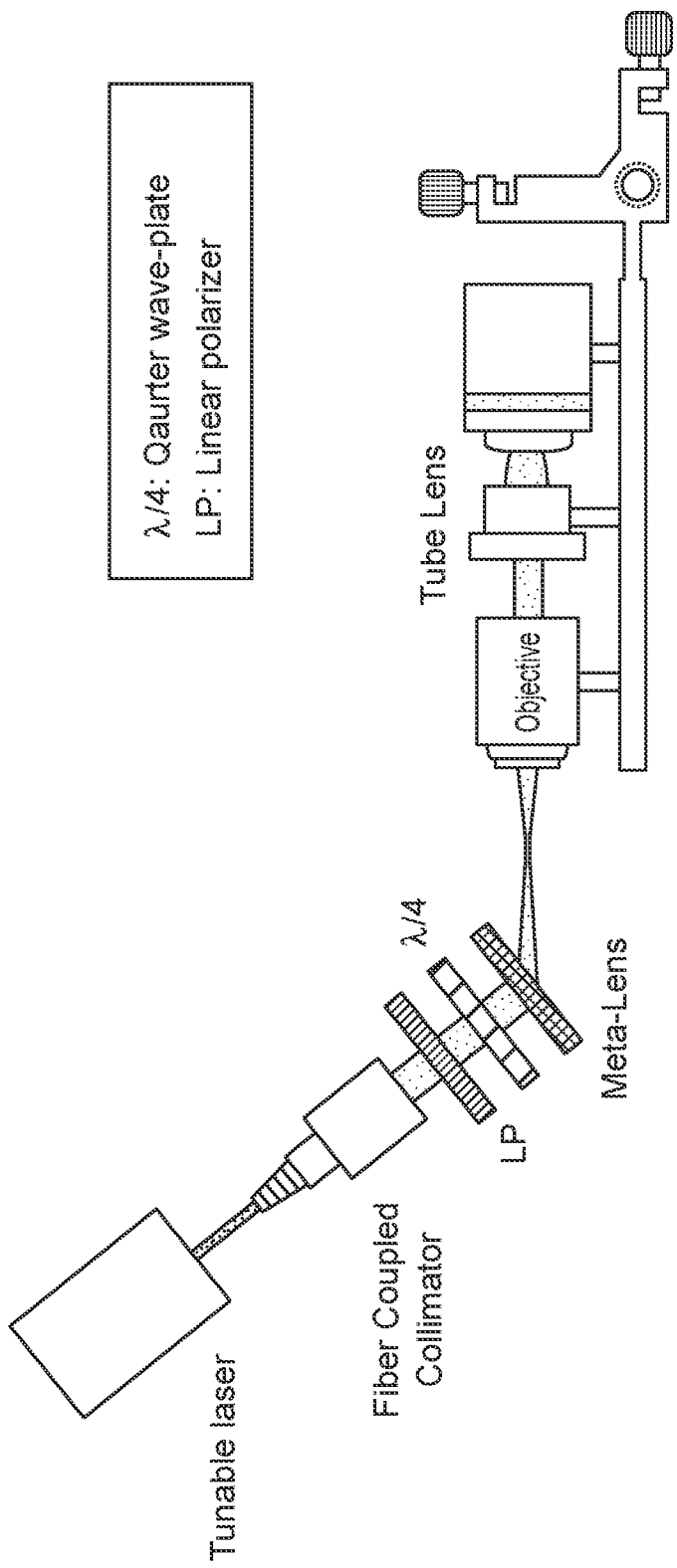
FIG. 4 illustrates a measurement setup for measuring characteristics of a meta-lens.

FIG. 4 illustrates a measurement setup used to characterize the meta-lenses to obtain the measurement results (e.g., the measurement results illustrated in FIG. 2B). Efficiencies as high as about 90% may be obtained. Meta-lenses may be characterized using a custom-built microscope including a fiber-coupled laser source, linear polarizer, quarter-waveplate, and objective lens paired with a tube lens to form an image on a camera (e.g., InGaAs camera model OWL 640 SWIR from Raptor Photonics). For efficiency measurements, a supercontinuum laser (e.g., SuperK and Select from NKT) with a linewidth of about 15 nm may be used. Again, the efficiency is the ratio of the optical power of the focused beam to the optical power of the incident beam.

In some embodiments, for the efficiency measurements, the optical power may be measured by substituting the InGaAs camera with a near infrared germanium photodiode (e.g., Thorlabs S122C). The incident optical power may be measured as the light passing through an aperture (aluminum on glass) with approximately a same size as the meta-lens. For spectral resolution characterization and focused beam profile measurements, the light source may be a tunable laser (e.g., HP-Agilent 8168-F) with a linewidth of about 1 pm.

Equation (3) shows that the meta-lens phase profile is wavelength dependent. Due to chromatic aberration, by changing the wavelength, the focal line moves. For on-axis focusing, due to the symmetric nature of the phase profile, the focal line shifts along the focusing axis. For an off-axis lens, changing the wavelength results in an additional lateral shift of the focal line.

Figure 5A:
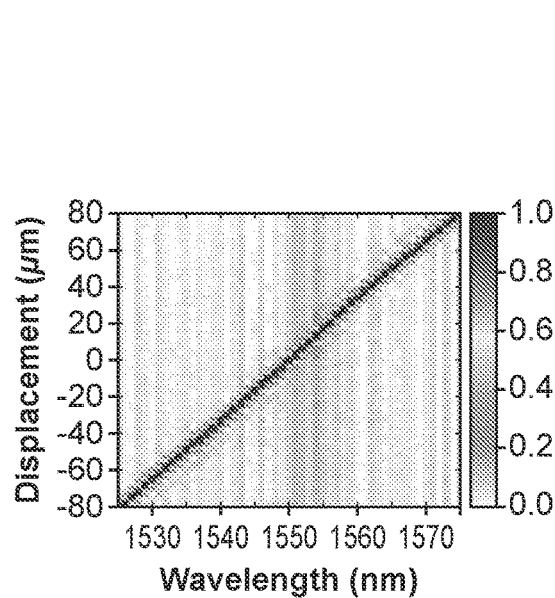
FIG. 5A illustrates experiment and simulation results for one or more off-axis meta lenses.

FIGS. 5A-5D illustrate experimental results for an example of a fabricated off-axis meta-lens with f=5 mm, NA=0.1, $\alpha$=45°, and $\lambda_d$=1550 nm. FIG. 5A shows displacement of the focal line along the x'-axis as a function of wavelength over a portion of the measured wavelength range. Specifically, the focal line shifts along the x'-axis normal to the focal axis as the wavelength is changed. No displacement along the y'-axis is observed, which is expected due to the absence of a phase gradient along the y-axis. This dispersive behavior can be described based on the generalized laws of refraction. The phase gradient $$\left(\frac{d\varphi_{nf}(x)}{dx}\right)$$

at the surface of the meta-lens (equation (3)) is a function of x. That is to say, at each position x, the meta-lens refracts a portion of the normally incident light by an angle $\gamma(x)$ as shown in equation (4), where $\lambda$ is the incident wavelength.

$$\sin(\gamma(x)) = \frac{\lambda}{2\pi}\frac{d\varphi_{nf}(x)}{dx} \quad (4)$$

The ability to precisely resolve wavelengths at a close distance (e.g., a few millimeters away) from the meta-lens offers great potential to implement a super-compact and high-resolution spectrometer. In some embodiments, three major factors that determine the spectral resolution ($\delta\lambda$) of the meta-lens include focal length (f), focusing angle ($\alpha$), and numerical aperture (NA). The NA determines the minimum resolvable wavelength difference in the focal plane based on the Rayleigh criterion $$\left(\frac{0.61 \cdot \lambda}{NA}\right).$$

By substituting equation (3) in to equation (4) and calculating the reciprocal linear dispersion of the meta-lens $$\left(\frac{\Delta\lambda}{\Delta r}\right)$$

at its center, x=0, equation (5) is obtained, where $\Delta\alpha$ is the change in the focusing angle due to a small change of the incident wavelength ($\Delta\lambda$).

$$\frac{\Delta\lambda}{\Delta r} = \frac{\Delta\lambda}{f \cdot \Delta\alpha} = \frac{\Delta\lambda}{f \cdot \left\{\sin^{-1}\left[\left(1 + \frac{\Delta\lambda}{\lambda_d}\right) \cdot \sin(\alpha)\right] - \alpha\right\}} \quad (5)$$

The spectral resolution of the meta-lens is then given by equation (6).

$$\delta\lambda = \frac{\Delta\lambda}{f \cdot \left\{\sin^{-1}\left[\left(1 + \frac{\Delta\lambda}{\lambda_d}\right) \cdot \sin(\alpha)\right] - \alpha\right\}} \cdot \frac{0.61\lambda}{NA} \quad (6)$$

Referring still to FIG. 5A, the shade-map and dashed line show experimental results and theoretical prediction, respectively. The lateral displacement ($\Delta x'$) of the focal line due to the wavelength change is calculated and shown as the dashed line in FIG. 5A, which follows the experimental results. This dispersive characteristic can be utilized to resolve the incident wavelength with high precision. Any vertical cut of the shade-map image is the intensity profile of the meta-lens at the focal length along the x'-axis. The tested and simulated meta-lens may have a designed focal length f=5 mm, designed focusing angle $\alpha=45°$, and designed dimensions of 1.5 mm×1.5 mm.

Figure 5B:
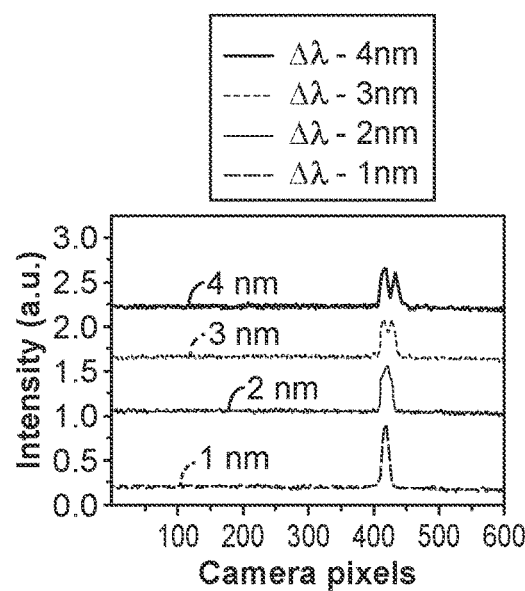
FIG. 5B illustrates experiment and simulation results for one or more off-axis meta lenses.

FIG. 5B illustrates a superposition of two beam profiles along the x-axis at the focal distance of wavelengths $\lambda_d=1550$ nm and $\lambda=1550$ nm+$\Delta\lambda$. The wavelength difference between the two beams is noted in the inset (where $\Delta\lambda=4$ nm is plotted at the top, $\Delta\lambda=3$ nm is the next plot down, and so forth). A wavelength difference as small as 3 nm is resolved. Camera pixels represent the lateral displacement along x'-axis. FIG. 5B shows that a high spectral resolution of 3 nm is achieved at the design wavelength. This spectral resolution is achieved by combining a highly dispersive lens design with tight focusing down to wavelength-scale lines. The spectral resolution is maintained over the 120-nm-wide bandwidth boundary of the setup. Based on equation (6), the theoretical spectral resolution is 2.9 nm, which is in agreement with the experimental results in FIG. 5B. Note that the pixel size of the camera may also affect the spectral resolution but may be is negligible here.

Figure 5C:
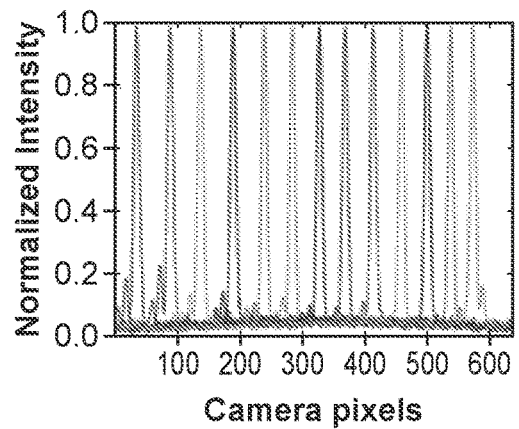
FIG. 5C illustrates experiment and simulation results for one or more off-axis meta lenses.

FIG. 5C illustrates measured intensity profiles at focal distance on camera for different wavelengths. The first peak (far left curve) is the measured focal line profile at 1470 nm wavelength. Wavelength increases by a step of 10 nm from left to right.

In a conventional grating-based spectrometer, one typically cannot reduce the distance between the grating and the detector without sacrificing spectral resolution. In a meta-lens-based spectrometer, the resolution can be held constant while making the focal length shorter, which is desired for an ultra-compact instrument, by appropriately increasing the NA. In order to demonstrate this, a meta-lens is designed with the same off-axis angle ($\alpha=45°$) as the previous meta-lens but with a reduced focal length f=1.5 mm and an increased NA=0.35. The hyperbolic phase profile equation (3) is modified for the higher NA to account for the different focal length, so that the full-width at half-maximum (FWHM) of the focal line is reduced to approximately 1.4$\lambda$.

Figure 5D:
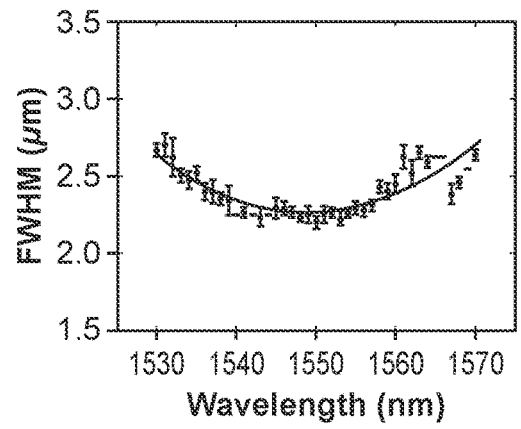
FIG. 5D illustrates experiment and simulation results for one or more off-axis meta lenses.

FIG. 5D illustrates FWHM of the beam for the modified lens at the focal line as a function of wavelength for the meta-lens with f=1.5 mm and $\alpha=45°$. At the design wavelength, the spectral resolution of 3 nm is maintained. However, the tradeoff is that for wavelengths away from the design, the spectral resolution is reduced. For example, at wavelengths of 1530 nm and 1570 nm, a spectral resolution of about 3.5 nm is achieved. This reduction is the result of chromatic aberration, which is more pronounced for a higher NA meta-lens. This is evident from FIG. 5D where the focal line widens away from the design wavelength.

Figure 5E:
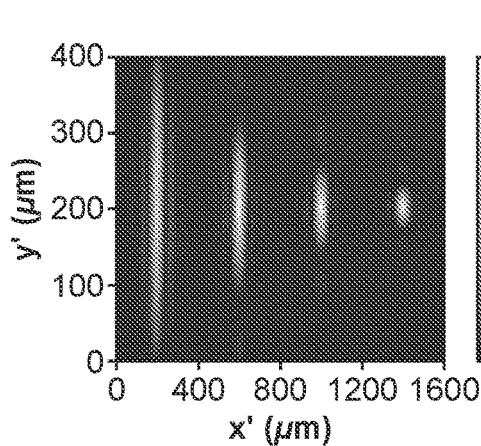
FIG. 5E illustrates experiment and simulation results for one or more off-axis meta lenses.

FIG. 5E illustrates experimental results of meta-lenses with phase profiles along both the x- and y-axes. Shown are measured focal spots of four meta-lenses in the x' y' plane normal to the focal axis with different meta-lens dimensions along the y-axis (about 188 µm, about 377 µm, about 753 µm and about 1500 µm, from left to right). The dimension of each meta-lenses along the x-axis is about 1.5 mm. By applying a lens phase profile also along the y-axis, light can be focused into a spot as shown. In addition, FIG. 5E shows that the size of the focal spot along the y'-axis can be controlled by adjusting the dimension of the meta-lens along the y-axis.

Figure 5F:
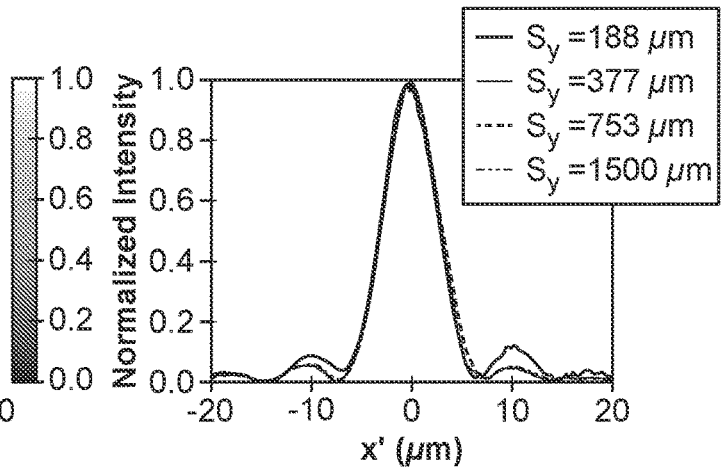
FIG. 5F illustrates experiment and simulation results for one or more off-axis meta lenses.

FIG. 5F illustrates measured intensity profile at focal distance along the x'-axis for the four meta-lenses in FIG. 5E. The experimentally achieved beam sizes are not affected by extra focusing along the y'-axis. The dimension of all four meta-lenses along the x-axis is fixed, yielding the same focal spot size along the x'-axis, which determines the spectral resolution. This design freedom can potentially reduce the size of a detector array for a spectrometer and at the same time enhance the signal-to-noise ratio by increasing the intensity of the signal per pixel.

For all designs simulated or measured in FIGS. 5A-5F, the constituent nanofins have design parameters of width W=105 nm, length L=410 nm, height H=1500 nm and center-to-center distance of 500 nm.

The spectral resolution can be further improved by increasing the focusing angle. The larger the angle, the stronger the dispersion, as shown in equation (5).

Figure 6A:
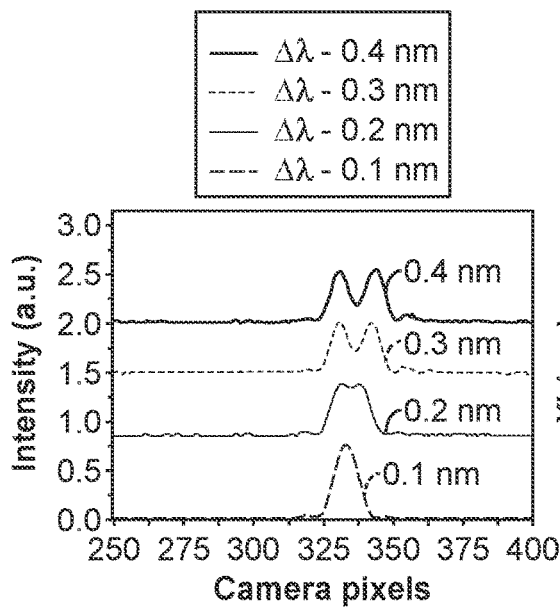
FIG. 6A illustrates experiment and simulation results for one or more off-axis meta lenses.

FIG. 6A illustrates superposition of two beam profiles along the x-axis at the focal line at wavelengths $\lambda_d=1550$ nm and $\lambda=1550$ nm+$\Delta\lambda$. The wavelength difference between the two beams is noted in the inset (where $\Delta\lambda=0.4$ nm is plotted at the top, $\Delta\lambda=0.3$ nm is the next plot, and so forth). FIG. 6A illustrates that wavelengths separated by 200 pm can be resolved using a meta-lens with design focus of $\alpha=80'$, and with f=about 6.1 mm and NA=about 0.35. The angular dispersion of this meta-lens is approximately 0.27 nm/mrad, which is typically unattainable using conventional blazed gratings due to the shadow effect. The meta-lens design dimensions may be about 1 cm along the x-axis and about 250 µm along the y-axis.

Figure 6B:
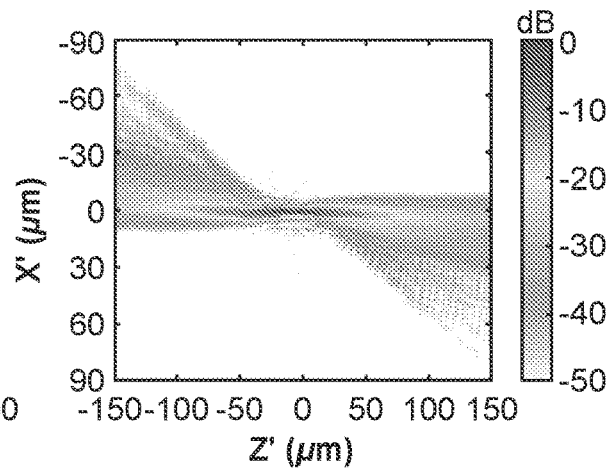
FIG. 6B illustrates experiment and simulation results for one or more off-axis meta lenses.
Figure 6C:
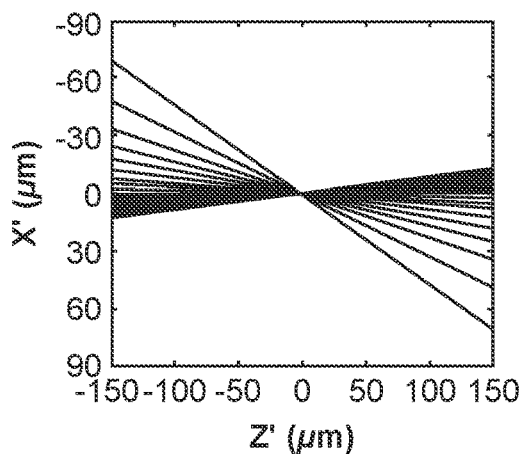
FIG. 6C illustrates experiment and simulation results for one or more off-axis meta lenses.
Figure 7:
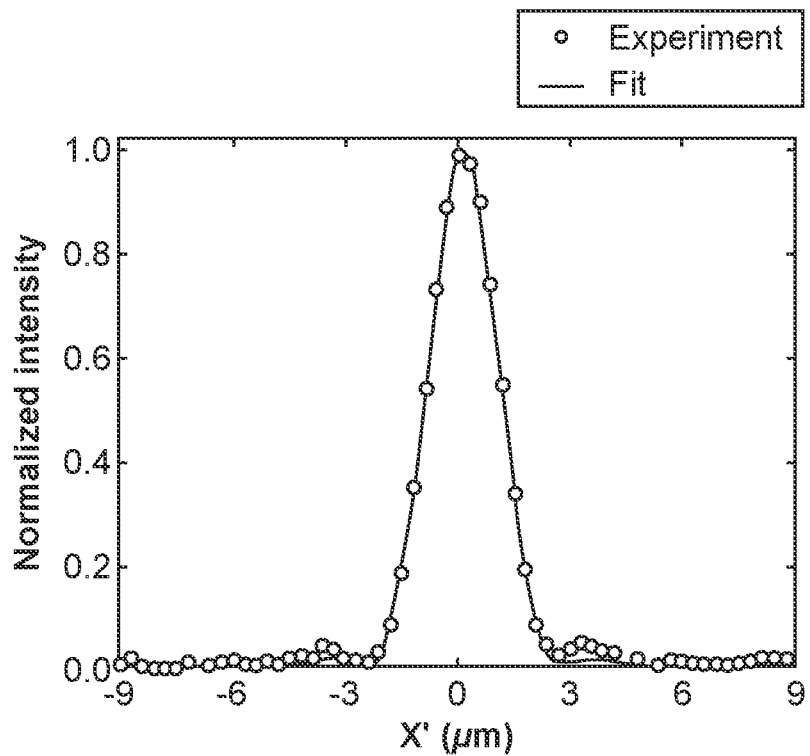
FIG. 7 illustrates experimental results together with theoretical fitting for intensity profile of the focal line of a meta-lens according to an embodiment of the present disclosure.

FIG. 6B illustrates the measured point spread function (PSF) of the meta-lens of FIG. 6A in decibel (dB) units. This measurement may be done using the measurement set-up shown in FIG. 4, where the objective lens, tube lens, and camera may be moved along the focal axis (z'-axis) in 500 nm steps to capture the intensity profile in the x'-y' plane. This stepping may be repeated to cover a ±150 µm range around the focal line (z'=0). The intensity distributions of all captured images may be combined to form the PSF. (Beam profile at the focal distance is shown in FIG. 7.) Due to the large size of the meta-lens (designed at 1 cm×250 µm) and available computational resources, the PSF may not be simulated using a full-wave analysis technique. Instead, a ray-tracing technique may be used in which the angles of the rays may be calculated based on equation (4), with results shown in FIG. 6C, qualitatively agreeing with the measurements in FIG. 6B.

Figure 6D:
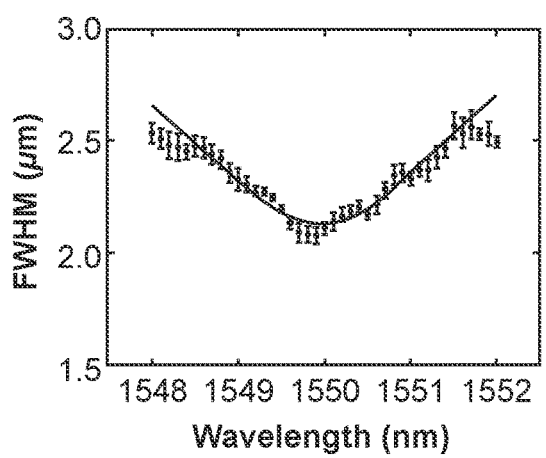
FIG. 6D illustrates experiment and simulation results for one or more off-axis meta lenses.

FIG. 6D illustrates FWHM of the focal line versus wavelength. In some embodiments, there is a trade-off between high spectral resolution and the wavelength range in which the spectral resolution is preserved. By moving from the design wavelength, the focal line broadens. In other words, by increasing spectral resolution, the bandwidth in which can be preserved is reduced. This can be seen in the FWHM plot in FIG. 6D, where the focused beam size becomes larger when going away from the design wavelength of about 1550 nm. Measured FWHM at about λ=1550 nm is very close to the theoretical diffraction-limited focal line (FWHM=λ/(2NA)=2.2 µm, NA=0.35).

Figure 6E:
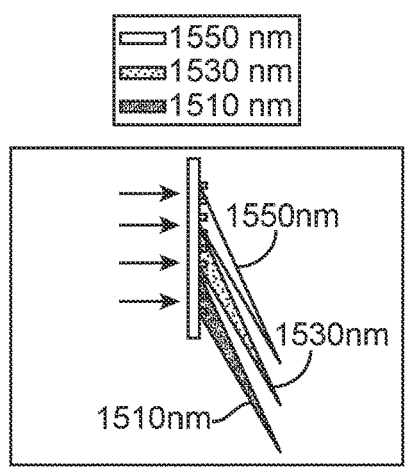
FIG. 6E illustrates experiment and simulation results for one or more off-axis meta lenses.
Figure 6F:
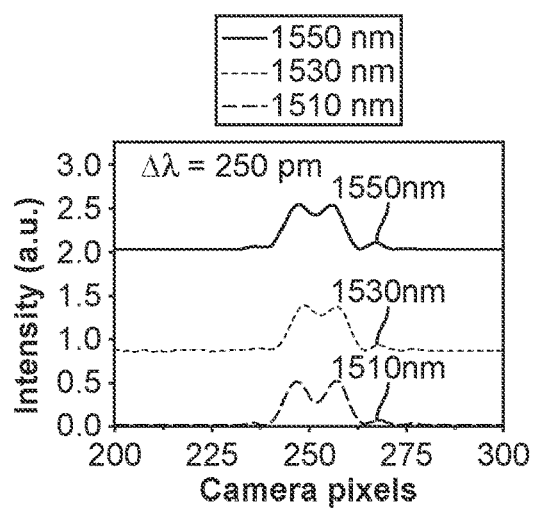
FIG. 6F illustrates experiment and simulation results for one or more off-axis meta lenses.

FIG. 6E illustrates that spectral resolution for a wider wavelength range may be maintained by using several meta-lenses together (e.g., on a common substrate) so that each of them covers a bandwidth of interest without interfering with other bandwidths, as shown for three meta-lenses designed for wavelengths of 1510 nm, 1530 nm, and 1550 nm. Results of this design are shown in FIG. 6F (1550 nm in the top plot, 1530 nm in the middle plot, and 1510 nm in the bottom plot). Each meta-lens focuses light along both the x'- and y'-axes, preventing overlap between their focused beam. This configuration expands the potential application of the meta-lens to various spectroscopy techniques such as Raman spectroscopy. For example, for a sensor detecting Raman signals, a combined configuration can yield the maximum resolution in multiple wavelength regimes of interest. This may allow for multispectral spectroscopy with different resolving power and functionalities.

For all designs simulated or measured in FIGS. 6A-6F, the constituent nanofins have design parameters of width W=105 nm, length L=410 nm, height H=1500 nm and center-to-center distance of 500 nm.

The spectral resolution of an off-axis meta-lens is the smallest wavelength difference one can distinguish on a camera. In some embodiments, there can be at least three factors that affect the spectral resolution including the NA, the reciprocal linear dispersion of the meta-lens, and the pixel size (D) of the camera used. The reciprocal linear dispersion is determined once the focal length and focusing angle of a meta-lens are given (equation (5)). Because the focal spot is magnified and imaged on a camera, pixel size determines the number of discrete points in which the two closest focal spots can be digitized. Recalling the Rayleigh criterion, if the pixel size of the camera is large compared to $$\frac{0.61\lambda}{NA} \cdot \frac{1}{2},$$

due to the Nyquist-Shannon sampling theorem, aliasing occurs such that distinguishing the two spots is not achieved. Note that in order to distinguish two spots at least three pixels are processed. Therefore, the spectral resolution is further set by the factor $$3 \cdot \frac{D}{M} \cdot \frac{\Delta\lambda}{\Delta r},$$

where D is the pixel size of the camera and M is the magnification of imaging system. The spectral resolution can then be shown by a convolution to be the sum of $$\frac{0.61\lambda}{NA} \cdot \frac{\Delta\lambda}{\Delta r} \text{ and } 3 \cdot \frac{D}{M} \cdot \frac{\Delta\lambda}{\Delta r}.$$

Numerical aperture in the present disclosure may be calculated as $$NA = \sin\left(\frac{\beta}{2}\right).$$

Figure 8:
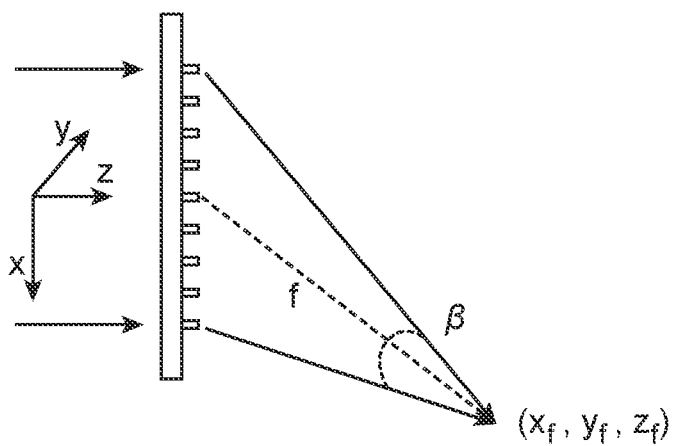
FIG. 8 illustrates determination of numerical aperture.

The angle β can be deduced using trigonometry once lens dimensions, focal length, and focusing angle are given, as illustrated in FIG. 8.

Figure 9:
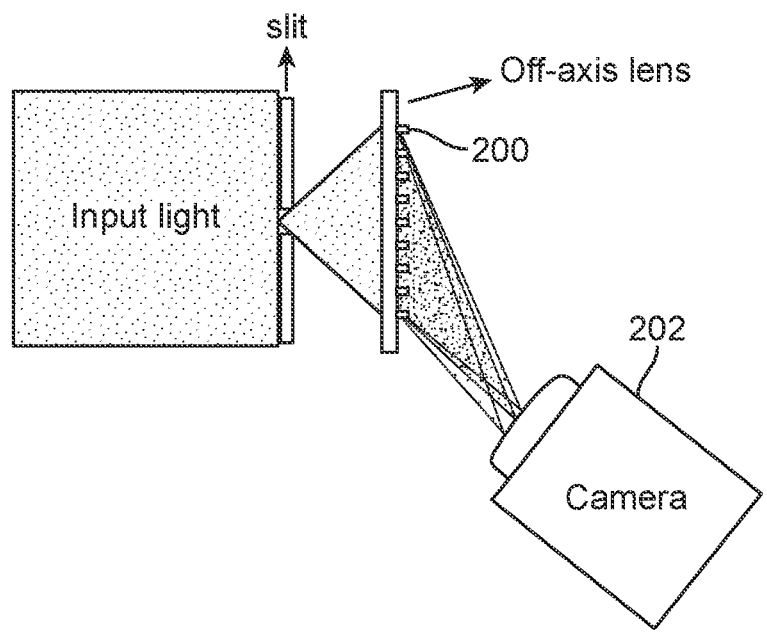
FIG. 9 illustrates a system incorporating one or more meta-lenses.

FIG. 9 diagrammatically illustrates an embodiment of a system in which light (e.g., reflected from an object) is provided through a slit to one or more off-axis meta-lenses 200 which refocus the light. An imaging device (e.g., camera) 202 images the refocused light. As can be seen in FIG. 9, the meta-lens (or a group of meta-lenses) 200 may be designed such that different wavelengths may be focused at different focal points. Thus, the imaging device may separately detect characteristics of the different wavelengths. In the illustrated configuration, no additional collimation optics are included, thus making a spectrometer incorporating the meta-lenses more compact. In some other embodiments, an optical system may include one or more collimation optics.

Off-Axis Meta-Lenses Including Other Nanostructures

Figure 10:
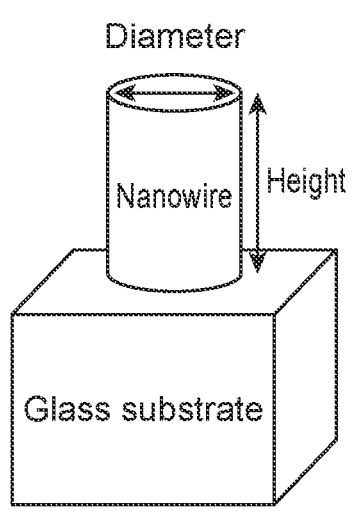
FIG. 10 illustrates a nanopillar for a meta-lens.
Figure 11:
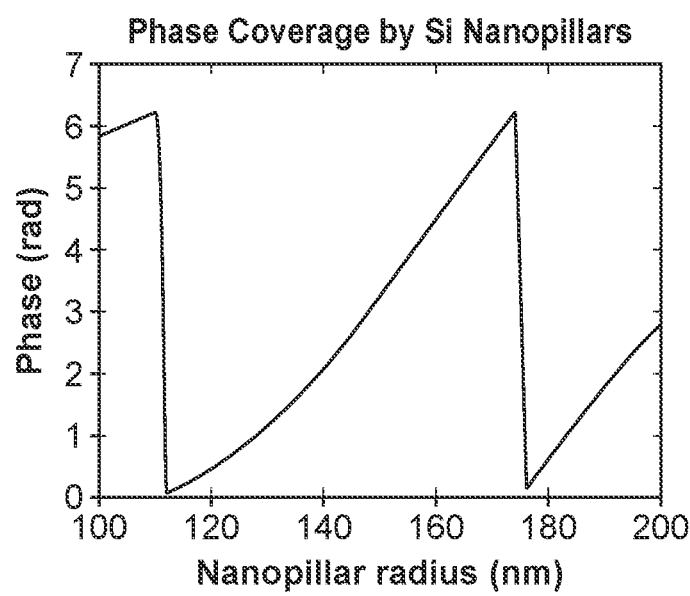
FIG. 11 illustrates phase versus nanopillar diameter at a wavelength of 1550 nm.
Figure 12A:
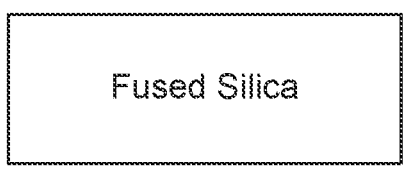
FIG. 12 illustrates a sample fabrication process for forming a visible spectrum dielectric metasurface based on a conformal chemical vapor deposition approach such as atomic layer deposition (ALD).
Figure 12B:
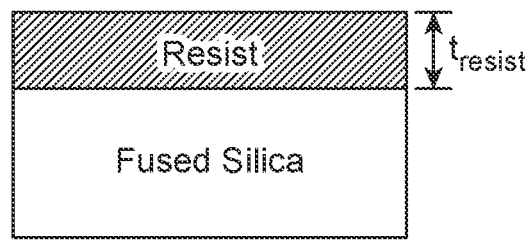
Figure 12C:
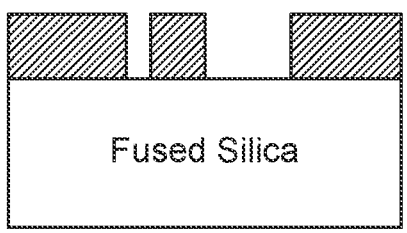
Figure 12D:
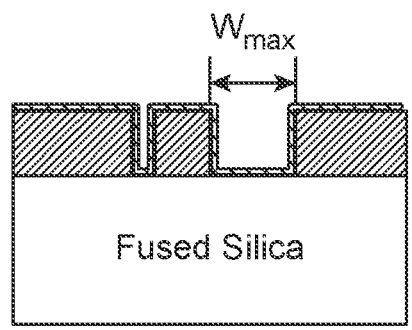
Figure 12E:
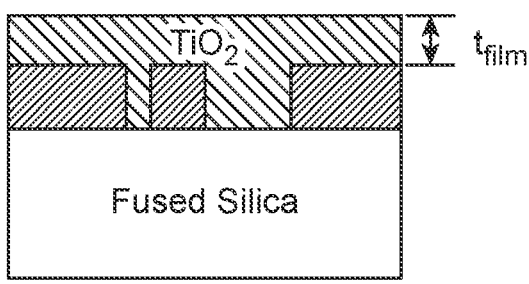
Figure 12F:
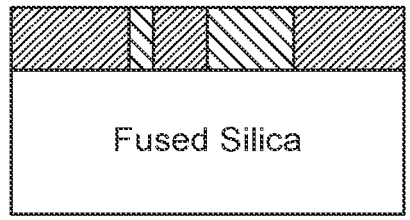
Figure 12G:
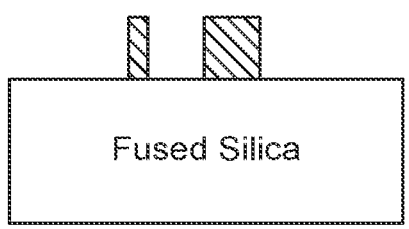

FIG. 10 illustrates another metasurface design that may be used instead of, or with, the nanofins described above to form a meta-lens. As shown in FIG. 10, nanopillar (e.g., nanopillars with circular cross section) may be disposed on a substrate (e.g., a glass substrate). A diameter of a nanopillar determines a phase change that the nanopillar will impart, as illustrated by simulation results plotted in FIG. 11. Therefore, rather than using rotation of nanofins as described above to achieve a phase profile for a meta-lens, the phase profile can be achieved by using multiple nanopillar with different diameters. Accordingly, neighboring nanopillars may have substantially a same height but different diameters. Due to the symmetrical cross-section, the metasurface may be insensitive to the polarization of incident light.

Fabrication of Metasurfaces of Meta-Lenses

In some embodiments, the nanostructures (e.g., nanofins or nanopillars) of the meta-lenses can be fabricated through a fabrication process using atomic layer deposition (ALD) that provides for the formation of high efficiency, visible spectrum dielectric metasurfaces (DMs) having the desirable characteristics disclosed herein in various embodiments of the present disclosure. The fabrication process may implement cleanroom process operations such as lithography and reactive ion etching, reproducibly providing deep sub-wavelength dielectric units with desired geometries and low loss in the visible spectrum.

Although various examples described and illustrated herein may refer to specific design wavelengths, such as red, green or blue, it is to be understood that a meta-lens may be designed and fabricated for any wavelength, e.g., in visible spectrum, outside of the visible spectrum, in telecom spectrum, or outside of the telecom spectrum.

In some embodiments, because the fabrication process uses ALD, different dielectric materials can be used to create a DM. For example, metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements can be deposited via ALD. In some embodiments, titanium dioxide ($TiO_2$) may be selected due to its high refractive index and low loss in the visible spectrum, but the fabrication process can use other dielectric materials, such as other dielectric materials selected depending on a desired end application.

In accordance with ALD, one or more deposition cycles may be performed by sequentially exposing a substrate, or a portion of the substrate, to deposition gases of chemical precursors or reactants. The precursors react and form at least a partial layer of a dielectric material on the substrate during a deposition cycle, and further deposition cycles can be performed until a desired thickness is attained. In some embodiments, composite coatings of different dielectric materials also can be formed using ALD.

FIG. 12 illustrates a sample fabrication process for forming a visible spectrum dielectric metasurface based on a conformal chemical vapor deposition approach such as atomic layer deposition (ALD). The process begins with providing a substrate as shown in step a of FIG. 12. The substrate may be transparent in the visible spectrum, such as shown, by way of example, as one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

A resist (e.g., an electron beam resist or a photoresist) is applied (shown in step b of FIG. 12) to the substrate by spinning at a particular rate to set a thickness of a resulting resist layer. The thickness of the resist layer may be a parameter which sets a height of resulting dielectric units in the fabricated DM, and may contribute to a phase of an exiting light, and affects an efficiency of the DM. In general, the spin rate and a viscosity of the resist can be controlled to adjust the thickness of the applied resist layer. As an example, a spin rate of about 5,000 rpm (revolutions per minute) while applying an electron beam resist of a particular viscosity may result in a thickness of a resist layer of about 400 nm.

As shown in step c of FIG. 12, the resist layer is exposed (e.g., using electron beam lithography or photolithography) and developed, forming an inverse pattern for forming the dielectric units. A resulting patterned resist layer is formed with, or defines, gaps, openings, or recesses exposing portions of a surface of the substrate. The openings can have an aspect ratio greater than about one, such as at least about 1.5:1, at least about 2:1, at least about 3:1, at least about 4:1, or at least about 5:1, and up to about 10:1 or greater, or up to about 20:1 or greater.

As shown in step d of FIG. 12, ALD is performed to deposit a film of a dielectric material over the patterned resist layer and the exposed portions of the surface of the substrate. A feature of ALD exploited in the fabrication process to achieve high aspect ratio dielectric units with smooth surfaces may be the conformal nature of the film as it is deposited. Top and sidewall surfaces of the patterned resist layer and the exposed portions of the surface of the substrate can be conformally coated by the dielectric material using ALD. Thus, the film can take on a shape of the openings in the patterned resist layer.

For example, an opening having substantially vertical sidewalls (e.g., substantially perpendicular to a respective exposed portion of the surface of the substrate within the opening) results in a dielectric unit having substantially vertical sidewalls, which allow precise control over a phase of an exiting wavefront with reduced phase errors. By way of comparison, top-down etching techniques can introduce sloped sidewalls, which can lead to phase errors. Further, the conformal coating provides for dielectric units having exceptionally smooth surfaces so as to reduce losses from scattering, such as having a root mean square (RMS) surface roughness of no greater than about 20 nm, no greater than about 15 nm, no greater than about 10 nm, no greater than about 5 nm, no greater than about 4 nm, no greater than about 3 nm, no greater than about 2 nm, or no greater than about 1 nm. By way of comparison, top-down etching techniques can result in undesired sidewall roughness, which can lead to scattering losses.

In accordance with ALD, a first ALD cycle is performed to deposit the dielectric material over the substrate held or housed within a deposition chamber, followed by performing a second ALD cycle to deposit the dielectric material over the substrate, followed by performing a third ALD cycle to deposit the dielectric material over the substrate, and so on until a desired amount of the dielectric material is deposited. In some embodiments, performing each ALD cycle includes exposing the substrate to deposition gases of chemical precursors or reactants. In the case of $TiO_2$ as the dielectric material, a first precursor is a titanium-containing precursor, such as an organometallic compound of titanium, and the second precursor is an oxygen-containing precursor. The first precursor and the second precursor react and form at least a partial layer of the dielectric material over the patterned resist layer and the exposed portions of the surface of the substrate. Accordingly, ALD is used to successively deposit additional dielectric material of the film in a layer-by-layer fashion until the film fills the openings in the patterned resist layer (as shown in step e of FIG. 12). Each deposited layer conformally coats a previously deposited layer.

In the fabrication process of some embodiments, a temperature of the ALD cycles, $T_{ALD}$, may be controlled to be lower than that used for ALD in other contexts. For example, in other contexts, ALD can be used to deposit films at about 150° C. or higher; however, for certain resists, temperatures above about 115° C. can cause a resist to reflow so that a resist pattern deteriorates. Thus, in some embodiments, for the ALD cycles as shown in steps d and e of FIG. 12, the temperature may be controlled or maintained below about 115° C., such as about 110° C. or below, about 105° C. or below, about 100° C. or below, or about 90° C.

In some embodiments, an amount of the dielectric material deposited in the ALD cycles (as shown in parts d and e of FIG. 12) may be a function of a maximum desired feature size (e.g., a feature width or diameter) of a dielectric unit (e.g., $w_{max}$ in step d of FIG. 12). Depending on the pattern of the resist layer, the dielectric film may be deposited to a thickness, tfilm, over the patterned resist layer to achieve the maximum desired feature size. For example, as illustrated in part e of FIG. 12, to obtain a feature width wmax in an opening of the patterned resist layer, $t_{film} \geq w_{max}/2$ and a top surface of the dielectric film is above the top surface of the patterned resist layer. In some embodiments, tfilm is at least about 50 nm greater than $w_{max}/2$. It is noted that the thickness tfilm corresponds to an amount of the deposited dielectric material that would cover a planar surface with an uniformly thick film of the dielectric material having the thickness tfilm, and corresponds a thickness of a top portion of the dielectric film deposited over the top surface of the patterned resist layer and extending over the openings of the patterned resist layer.

As shown in step f of FIG. 12, blanket etching may be performed to remove the top portion of the dielectric film and expose the top surface of the patterned resist layer and top surfaces of resulting dielectric units disposed in the openings of the patterned resist layer. For example, reactive ion etching may be used, such as using a mixture of $Cl_2$ gas and $BCl_3$ gas, to remove the top portion of the dielectric film to an etch depth substantially equal to the thickness $t_{film}$, although an etch depth greater than the thickness tfilm is also contemplated, such as including removing a top portion of the patterned resist layer via an etch depth of $t_{film}$+ about 10 nm. In such fashion, excess dielectric film is removed, and the patterned resist layer (or a residual thereof) is exposed.

As shown in step g of FIG. 12, the patterned resist layer is removed by exposing to a resist removal solvent, leaving high aspect ratio dielectric units of the DM over the substrate, and having an aspect ratio greater than about one, such as at least about 1.5:1, at least about 2:1, at least about 3:1, at least about 4:1, or at least about 5:1, and up to about 10:1 or greater, or up to about 20:1 or greater.

Figure 13A:
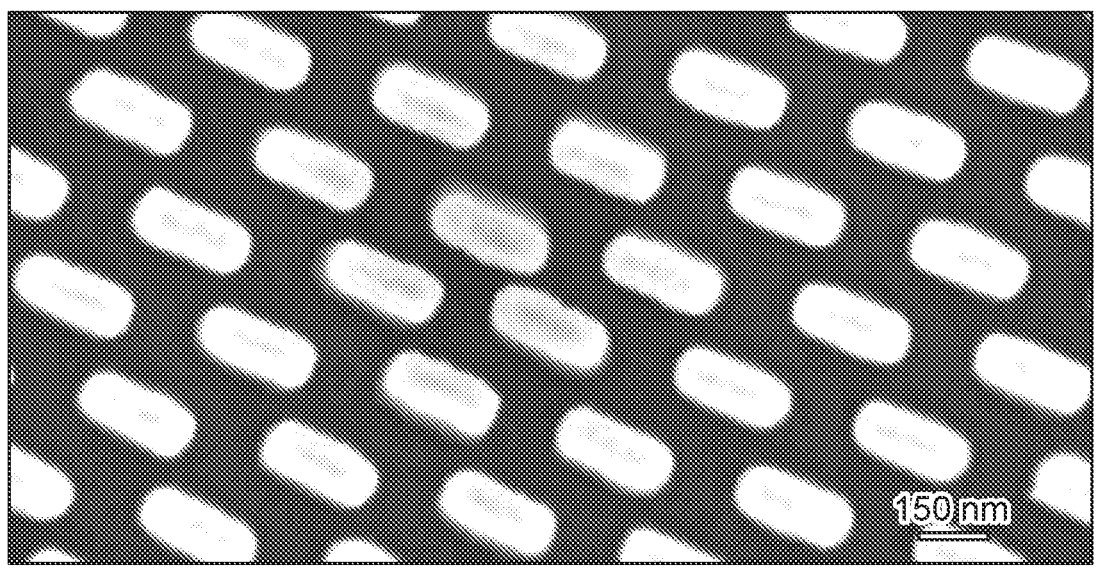
FIG. 13A illustrates a scanning electron microscope (SEM) image of a top view of dielectric units formed using the disclosed fabrication process.

FIG. 13A illustrates a scanning electron microscope (SEM) image of a top view of dielectric units formed using the disclosed fabrication process. The fabrication process can produce arbitrary nanostructures such as nanopillars or nanofins of varying widths, and can attain such widths on a visible spectrum sub-wavelength scale.

Figure 13B:
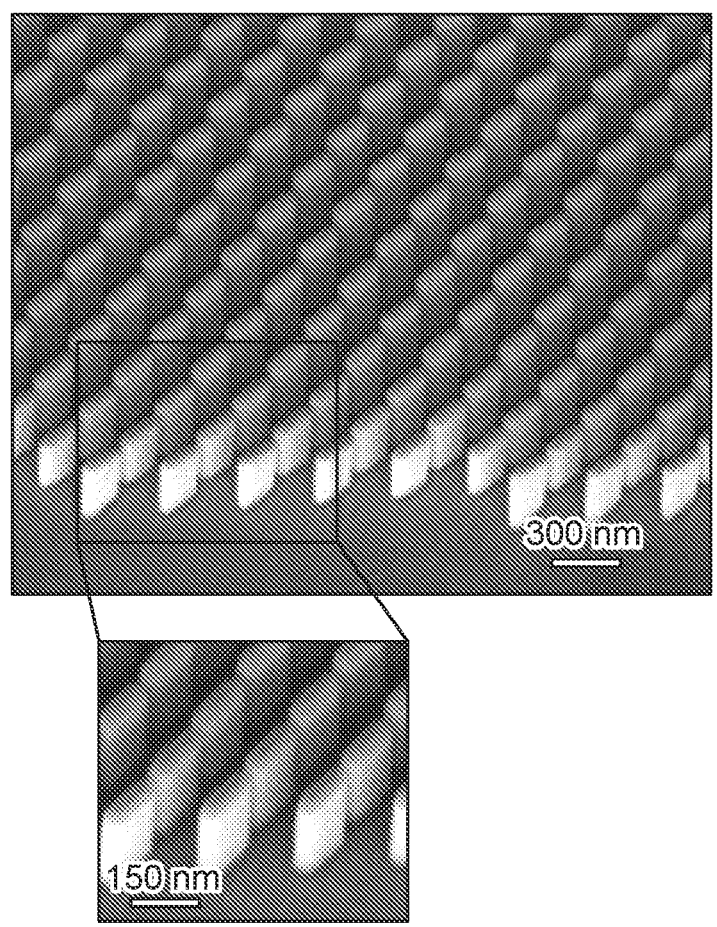
FIG. 13B illustrates a scanning electron microscope (SEM) image of a perspective view of the dielectric units formed using the disclosed fabrication process.
Figure 14A:
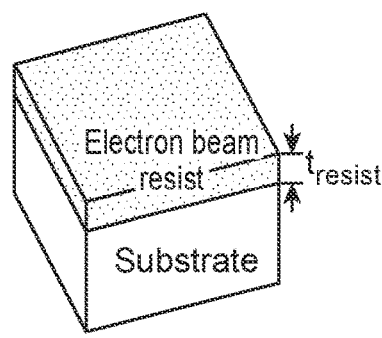
FIG. 14 illustrates a sample fabrication process for forming dielectric metasurfaces.
Figure 14B:
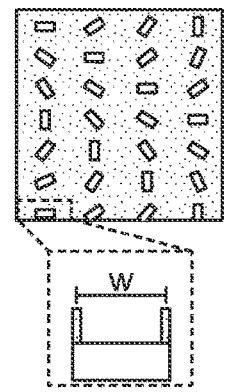
Figure 14C:
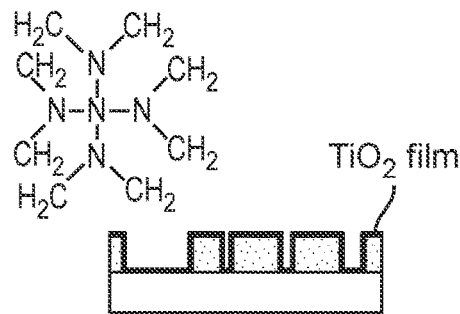
Figure 14D:
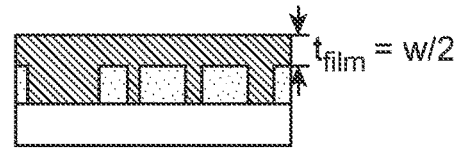
Figure 14E:
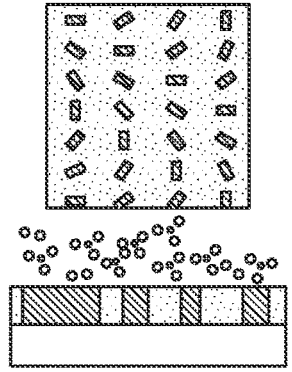
Figure 14F:
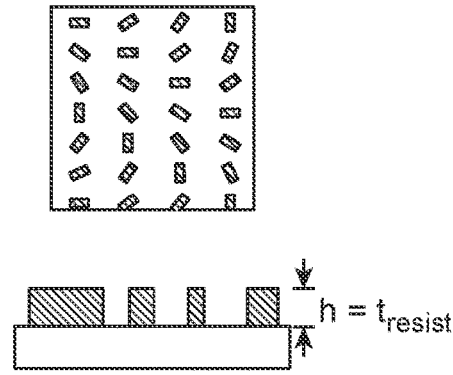

FIG. 13B illustrates a scanning electron microscope (SEM) image of a perspective view of the dielectric units formed using the disclosed fabrication process. The resulting nanostructures may be anisotropic with sidewalls substantially perpendicular to a surface of a substrate. A feature width down to about 25 nm on an about 75 nm pitch (center-to-center spacing between adjacent dielectric units), with a height of the dielectric units from about 100 nm to about 500 nm, can be attained by way of example. Further feature width reduction can be attained with the fabrication process of some embodiments of this disclosure. For example, dielectric units with widths of about 10 nm or less are encompassed by this disclosure.

In some embodiments, dielectric units with high aspect ratios can be attained with the fabrication process. For example, dielectric units with heights up to about 500 nm or greater or up to about 1,000 nm or greater can be attained. In some embodiments, widths of dielectric units are less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have generally rectangular or other elongated cross-sections (along or projected onto a plane parallel to a surface of a substrate over which the dielectric units are disposed) having a width and a length, and where the length is greater than the width, and the length and the width are less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have generally circular cross-sections or other even rotationally symmetric cross-section (along or projected onto a plane parallel to a surface of a substrate over which the dielectric units are disposed) having a diameter, and the diameter is less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm. In some embodiments, a pitch of adjacent dielectric units is less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have substantially consistent widths or diameters along their long axes, such that a width or diameter at a top end of a dielectric unit is substantially the same as a width or diameter at a bottom end of the dielectric unit. It is noted that the above-mentioned dimensions are also applicable for openings of a patterned resist layer within which dielectric units are formed during the fabrication process of some embodiments.

In some embodiments, an approach for creating transmissive dielectric metasurfaces (DMs) may use a bottom-up nanofabrication process via atomic layer deposition, to provide high-aspect-ratio, anisotropic dielectric nanostructures with reduced surface roughness. In some embodiments, $TiO_2$ may be selected as a base material because it has a transparency window ($k \approx 0$) for wavelengths longer than about 360 nm and its inter-band transition lies just outside of the visible spectrum, resulting in a sufficiently high index of refraction for strong light-matter interactions. $TiO_2$ may be deposited by atomic layer deposition (ALD) at about 90° C. with tetrakis(dimethylamido)titanium (TDMAT) as a precursor due to its high deposition rate and absence of defect-driven absorption that may occur with $TiCl_4$-based precursors. Additionally, use of an ALD process offers several advantages. ALD is a self-limiting process providing conformal coverage and monolayer control of a film thickness. The conformal nature of the technique is desirable to produce high aspect ratio nanostructures. The uniform and monolayer coverage yields smooth films with reduced defects compared to those prepared via sputtering or evaporation. Furthermore, the ALD process allows precise control of a material phase of the deposited TiO$_2$, producing amorphous, rutile, or anatase films, depending on the deposition temperature.

The TiO$_2$ films may have surface roughness that is much smaller than the incident wavelength. In some embodiments, a TiO$_2$ film may be deposited on a fused silica substrate. The root mean square (RMS) roughness may be about 0.738 nm, which is on the order of the surface roughness of the underlying substrate. The measured roughness of the amorphous TiO$_2$ is an order of magnitude less than other phases such as polycrystalline rutile or anatase. The latter two phases generally have grain boundaries and RMS roughness as high as about 5-10 nm, both of which can contribute to light-scattering loss.

To achieve highly efficient metasurface devices while preserving the optical properties of ALD-prepared TiO$_2$, the fabrication process shown in FIG. 14 may be used.

As illustrated in step A of FIG. 14, an electron beam resist (EBR) is spun onto a fused silica substrate to produce a layer with thickness, tresist. Control of $t_{resist}$ is desired because it sets a height of final nanostructures. The resist is patterned using electron beam lithography and is subsequently developed in solution to remove the exposed EBR. This pattern may be the inverse of a final metasurface.

As illustrated in step B of FIG. 14, the inverse of a final metasurface pattern is imprinted into the EBR by electron beam lithography and subsequent development of the pattern. The boxed area is an expanded cross-section of a maximum feature width, w.

The exposed sample is transferred to an ALD chamber set to about 90° C. The purpose of this temperature is twofold: It produces the desired amorphous phase and keeps the EBR below its glass transition temperature (e.g., prevents deterioration of nanoscale patterns).

As illustrated in step C of FIG. 14, initial TiO$_2$ deposition via ALD conformally coats sidewalls and top of the EBR and exposed substrate. During the deposition, the gaseous TiO$_2$ precursor (Tetrakis(dimethylamido)titanium or TDMAT) coats substantially all exposed surfaces, producing a conformal film on top and sidewalls of the EBR as well as on the exposed fused silica substrate. The ALD process is allowed to reach a specific thickness such that all features are completely filled with TiO$_2$.

As illustrated in step D of FIG. 14, completed deposition of the TiO$_2$ yields a film thickness greater than half the width of the maximum feature size, $t_{film} \geq w/2$. Because the conformal ALD process fills exposed features from both sides, the total ALD film thickness is $t_{film} \geq w/2$, where w is a maximum width of all gaps or recesses. In some embodiments, the deposition may be allowed to proceed well beyond the lower threshold of half the feature width to ensure that TiO$_2$ had sufficiently diffused into all pores and that there are no voids in the final nanostructures.

As illustrated in step E of FIG. 14, the residual TiO$_2$ film that coats a top surface of the resist is removed by reactive ion etching the sample in a mixture of BCl$_3$ and Cl$_2$ gas (about 8:2), similar to a planarization technique. The etch depth may be substantially equal to tfilm so that the etching process exposes the underlying resist and the top of the nanostructures. Step E of FIG. 14 shows the exposed tops of the TiO$_2$ metasurface and residual EBR after reactive ion etching with a mixture of Cl$_2$ and BCl$_3$ ions (top and side views).

As illustrated in step F of FIG. 14, the remaining resist is removed to retain the nanostructures that form the metasurface. In this way, nanostructures of heights tresist may be obtained while depositing a film of thickness $t_{film}$ w/2, which is time-saving and efficient. Step F of FIG. 14 shows the final dielectric metasurface after removal of remaining EBR (top and side views).

In some embodiments, the approach illustrated in FIG. 14 may be different from liftoff techniques, which generally cannot be used due to a conformal coating of ALD films. In addition, creating high-aspect-ratio nanostructures via dry etching of TiO$_2$, similar to other dielectric materials, may be difficult and can lead to increased sidewall roughness. This ALD process may be also different from techniques where patterns created are generally fixed by a set template (e.g., anodic alumina or inverse opal). Here the ALD process may allow flexibility to form more complex nanostructures because ALD is used directly on an exposed EBR.

Although focus of incident light (e.g., collimated light) to a spot or a line has been illustrated and described in the present disclosure by way of example, it should be understood that the concepts of the present disclosure may additionally or alternatively be used, for example, for focusing point to point, spot to spot, or line to line.

In some embodiments, a meta-lens may have a stacked configuration, where a first substrate with first nanopillars or first nanofins (or other nanostructures) is stacked on a second substrate with second nanopillars or second nanofins (or other nanostructures). Further, in some embodiments, more than two substrates with associated nanostructures may be stacked. Such a stacked configuration may be in a form of two or more meta-lens units in a single fabricated meta-lens, or may be two or more separately fabricated meta-lenses stacked together. In some embodiments, each meta-lens or meta-lens unit has a different phase profile. For example, a first meta-lens or meta-lens unit may have a phase profile designed for a particular focal length, and a second meta-lens or meta-lens unit may have a phase profile designed to correct for aberrations.

Although described herein with respect to transmission of visible light through the meta-lens, in some embodiments, the substrate may be reflective, and the meta-lens is a reflective lens. For example, the nanopillars or the nanofins may be fabricated over a mirror. In some such embodiments, the substrate includes a reflective layer. A material of the substrate may be transmissive (e.g., glass or other transmissive material) with a reflective layer on either side, or the material of the substrate may be non-transmissive, with the reflective layer between the material of the substrate and the nanopillars or the nanofins. A dielectric layer (e.g., a dielectric thin film) may optionally be disposed between the reflective layer and the nanopillars. Examples of a reflective layer may include a metallic layer such as a layer of aluminum, silver, gold, or other metal, or a layer of any other reflective material.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A spectrometer, comprising:
   an off-axis meta-lens configured to receive light including a plurality of light components of different wavelengths, and to refocus and disperse the light components onto a plurality of off-axis focal points associated with the different wavelengths, the off-axis meta-lens including:
      a substrate, and
      a plurality of nanostructures disposed on the substrate, the nanostructures together defining the phase profile of the off-axis meta-lens, the phase profile achieving an off-axis focus, each nanostructure having at least one design parameter of the nanostructure that imparts a phase shift of light passing through the nanostructure; and
   an imaging device configured to record the refocused light components at the off-axis focal points respectively.

2. The spectrometer of claim 1, wherein the imaging device is further configured to separately detect characteristics of the light components of the different wavelengths.

3. The spectrometer of claim 1, wherein the spectrometer includes a plurality of off-axis meta-lens including said off-axis meta-lens, each of the plurality of off-axis meta-lens is configured to refocus and disperse light of a different spectrum.

4. The spectrometer of claim 1, wherein the nanostructures include nanofins, the at least one design parameter of each nanofin is an orientation of the nanofin with respect to an axis in a plane of the substrate, and the orientations of the nanofins vary to compensate propagation phase differences associated with optical path differences of the nanofins.

5. The spectrometer of claim 1, wherein the nanostructures include nanopillars, the at least one design parameter of each nanopillar is a diameter of the nanopillar, and the diameters of the nanopillars vary to compensate propagation phase differences associated with optical path differences of the nanopillars.

6. A planar dispersive device, comprising:
   a substrate; and
   a plurality of off-axis meta-lenses arranged in a planar configuration, each off-axis meta-lens configured to refocus and disperse light of a different designed wavelength range;
   wherein each off-axis meta-lens includes:
      a plurality of nanostructures disposed on the substrate, each nanostructure having at least one design parameter of the nanostructure that imparts a phase shift of light passing through the nanostructure, the phase shifts of the nanostructures together defining a wavelength dependent phase profile of the off-axis meta-lens, the wavelength dependent phase profile achieving refocus and dispersion of light of a corresponding designed wavelength range into a plurality of light components that focuses at a plurality of different designed off-axis focal points; and
   wherein the different designed off-axis focal points of the plurality of off-axis meta-lenses locate at a common plane.

7. A meta-lens having a phase profile, comprising:
   a substrate; and
   a plurality of nanostructures disposed on the substrate, the nanostructures together defining the phase profile of the meta-lens, the phase profile achieving an off-axis focus, each nanostructure having at least one design parameter of the nanostructure that imparts a phase shift of light passing through the nanostructure,
   wherein the nanostructures include nanofins, and the at least one design parameter of each nanofin is an orientation of the nanofin with respect to an axis in a plane of the substrate, and
   at least some of neighboring nanofins are oriented at different orientation angles, the orientation angles determine the phase shifts to compensate propagation phase differences of the neighboring nanofins, and the propagation phase differences are associated with differences of optical paths between locations of the neighboring nanofins on the substrate and an off-axis focal point of the meta-lens.

8. A meta-lens having a phase profile, comprising:
a substrate; and
a plurality of nanostructures disposed on the substrate, the nanostructures together defining the phase profile of the meta-lens, the phase profile achieving an off-axis focus, each nanostructure having at least one design parameter of the nanostructure that imparts a phase shift of light passing through the nanostructure,
wherein the nanostructures include nanopillars, and
at least some of neighboring nanopillars have different diameters, the diameters determine the phase shifts to compensate propagation phase differences of the neighboring nanopillars, and the propagation phase differences are associated with differences of optical paths between locations of the neighboring nanopillars on the substrate and an off-axis focal point of the meta-lens.

* * * * *